US006175487B1

(12) United States Patent
McCartney et al.

(10) Patent No.: US 6,175,487 B1
(45) Date of Patent: Jan. 16, 2001

(54) LUMINAIRE ASSEMBLY

(75) Inventors: John Charles McCartney, Newark; Jack Leighton Ries; Mark Frederick Keller, both of Granville, all of OH (US)

(73) Assignee: NSI Enterprises, Inc., Newark, OH (US)

( * ) Notice: Under 35 U.S.C. 154(b), the term of this patent shall be extended for 0 days.

(21) Appl. No.: 09/134,877

(22) Filed: Aug. 15, 1998

(51) Int. Cl.[7] .......... H02B 1/04
(52) U.S. Cl. .......... 361/674; 174/DIG. 2
(58) Field of Search .......... 174/DIG. 2, 52.2; 361/674; 29/827, 841; 362/153.1, 220, 221, 260, 265, 294, 364, 373, 427; 264/115, 125

(56) References Cited

U.S. PATENT DOCUMENTS

| | | | | |
|---|---|---|---|---|
| 2,683,766 | | 7/1954 | Cunningham . | |
| 2,795,009 | | 6/1957 | Gosnell et al. . | |
| 2,862,992 | | 12/1958 | Franz . | |
| 3,747,037 | * | 7/1973 | Earing . | |
| 4,393,435 | * | 7/1983 | Petrina | 361/674 |
| 4,570,207 | | 2/1986 | Takahashi et al. . | |
| 4,916,363 | * | 4/1990 | Burton . | |
| 5,006,764 | * | 4/1991 | Swanson . | |
| 5,386,086 | * | 1/1995 | Sayles . | |
| 5,623,123 | | 4/1997 | Umehara . | |
| 5,686,697 | | 11/1997 | Miller et al. . | |
| 5,727,873 | | 3/1998 | Tyson . | |

FOREIGN PATENT DOCUMENTS

| | | | | |
|---|---|---|---|---|
| 464421 | * | 4/1950 | (CA) | 361/674 |

* cited by examiner

*Primary Examiner*—Gerald Tolin

(57) ABSTRACT

An electrical assembly adapted for use with a luminaire includes a housing formed of metal and having an interior surface defining a cavity therein. The electrical assembly further includes an unimpregnated ballast which is oriented within the cavity and which has coil leads projecting therefrom, the ballast encapsulated within a thickened mixture of curable thermoset polymer resin and finely divided inorganic particulate. the finely divided inorganic particulate and the thermosettable polymer resin is preferably provided in, respectively, a 3:1 ratio by weight.

7 Claims, 4 Drawing Sheets

LUMINAIRE ASSEMBLY

TECHNICAL FIELD

This invention relates to a luminaire assembly and particularly one of the high-intensity discharge type.

BACKGROUND ART

Luminaire manufacturers must balance several factors in designing luminaires, in terms of part cost, assembly cost and timing, and the particular application to which a luminaire is directed. Typically, the manufacture and assembly of luminaires, and particularly high-intensity discharge (HID) luminaires, requires a lead time from the point of customer order to the date of delivery due to the many steps involved in the preparing and assembling the subcomponents of the luminaire. Such components that may require such lead time include the electrical assembly. Thus, luminaires do not typically lend themselves to just-in-time manufacturing. Customers of any product demand a timely delivery of goods after ordering, and luminaire buyers are no different. Therefore, manufacturers of lighting systems must often rely upon building up an inventory of parts and subassemblies ahead of time and keeping goods in stock in anticipation of the next order. However, this is a costly proposition which involves having working capital tied up in inventory that is not yet sold to a customer.

Luminaires typically include an optical assembly and an electrical assembly. The optical assembly contains the lamp and the refractor and/or reflector, which produces and directs light at varying degrees. The electrical assembly provides power to the lamp and has a housing which is generally formed of metal and which encloses the electrical circuitry including the ballast. The ballast is used to provide necessary circuit conditions for starting and operating an electric-discharge lamp, such as high intensity electric-discharge lamps of the high pressure sodium, metal halide, or mercury type.

The ballast itself is typically impregnated through a lengthy impregnation dipping process which is complete before the ballast is assembled within an electrical assembly. Impregnation bonds together the laminations which are present in a ballast, reducing the magnetically-induced vibrations which may cause noise. Impregnation also increases the dielectric strength of the insulation system which protects against voltage stress and breakdown from corona. Further, impregnation provides for corrosion resistance and reduces the operating temperature of the ballast.

Moreover, the electrical assembly of a luminaire, and particularly its housing, is sometimes large due to need for relatively large surface area to dissipate ballast heat. The housing size may also be needed in order to provide the clearance necessary for the tools to fit and function to assemble the luminaire and its various subcomponents. Depending on the positioning of the electrical assembly relative to the optical assembly (i.e. above or below), the size of the housing could result in less uplight or downlight, respectively, and thus contribute to an overall less efficient lighting system.

Consequently, the need has developed for an indoor luminaire assembly which permits for a relatively quick and less expensive assembly. The luminaire assembly should not require significant lead time for the manufacture and assembly of its subcomponents and should allow for just-in-time assembly, without the necessity of costly inventory levels. The luminaire should provide for the desired amount of illumination for its application. And the luminaire should include an electrical assembly or housing which is relatively small in order to achieve efficient lighting and not impede the uplight or downlight of the assembly. Further, the electrical assembly should be able to be assembled and finished concurrently with the ballast so as to avoid the lengthy lead time currently required.

SUMMARY OF THE INVENTION

It is a principal object according to the present invention to provide a luminaire assembly which allows for a relatively quick and less expensive assembly than current luminaires.

It is another object according to the present invention to provide a luminaire assembly which does not require significant lead time for the manufacture and assembly of the subcomponents.

It is a further object according to the present invention to provide a luminaire assembly which permits for just-in-time assembly and does not require building up a costly inventory of stock.

It is a still further object according to the present invention to provide a luminaire which is also relatively easy to assemble.

It is yet another object according to the present invention to provide a luminaire for generating the desired amount of illumination for its application, and particularly a great amount of uplight and downlight for retail and light industrial applications.

It is moreover a further object according to the present invention to provide a luminaire assembly and method for manufacturing the same, which allows for the manufacturing and finishing of the ballast concurrently with the luminaire in order to reduce the total overall manufacturing time.

In carrying out the above objects, features and advantages of the present invention, provided is an electrical assembly adapted for use with a luminaire and which includes a housing formed of metal and having an interior surface defining a cavity therein. The electrical assembly also includes an unimpregnated ballast which is positioned within the cavity and which has coil leads projecting therefrom. The ballast is encapsulated within a thickened mixture of, preferably, a curable thermoset polymer resin and finely divided inorganic particulate which engages the interior surface of the housing. In a preferred embodiment, the finely divided inorganic particulate mixture and the polymer resin is preferably provided in, respectively, a 3:1 ratio by weight.

In keeping with the teachings according to the present invention, also provided is a luminaire assembly which has an optical assembly for directing light generated by a lamp. The luminaire assembly includes an electrical assembly which has a housing formed of metal. The housing includes a body portion and a removable cover portion which therein defines a cavity. The removable cover portion has at least one electrical component mounted thereto which projects into the cavity. A ballast is disposed within the cavity of the housing and is encapsulated within a curable mixture of polymer resin and finely divided inorganic particulate. This curable mixture thickens and secures the ballast therein.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
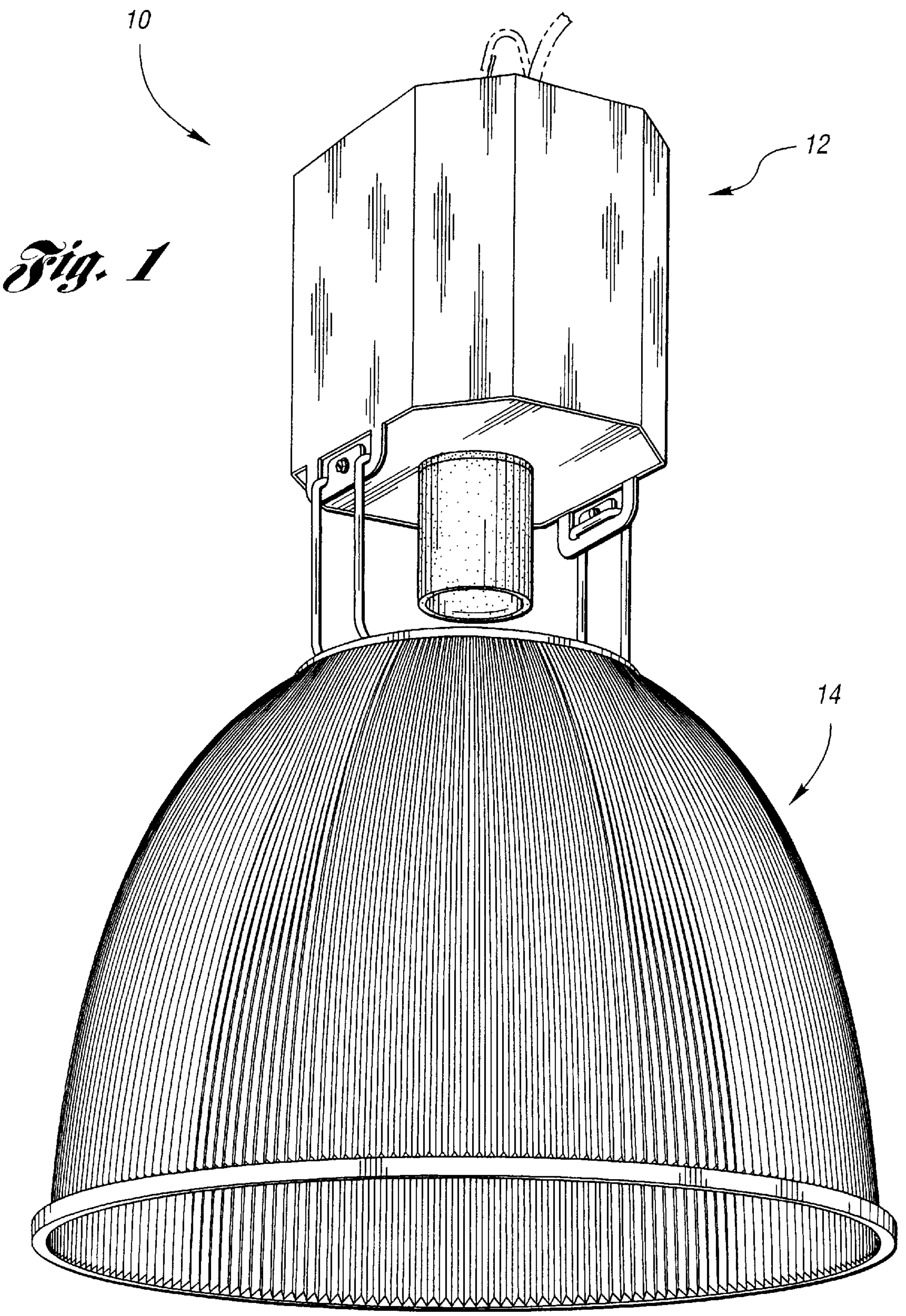
FIG. 1 is a perspective view of a luminaire assembly according to the present invention.
Figure 2:
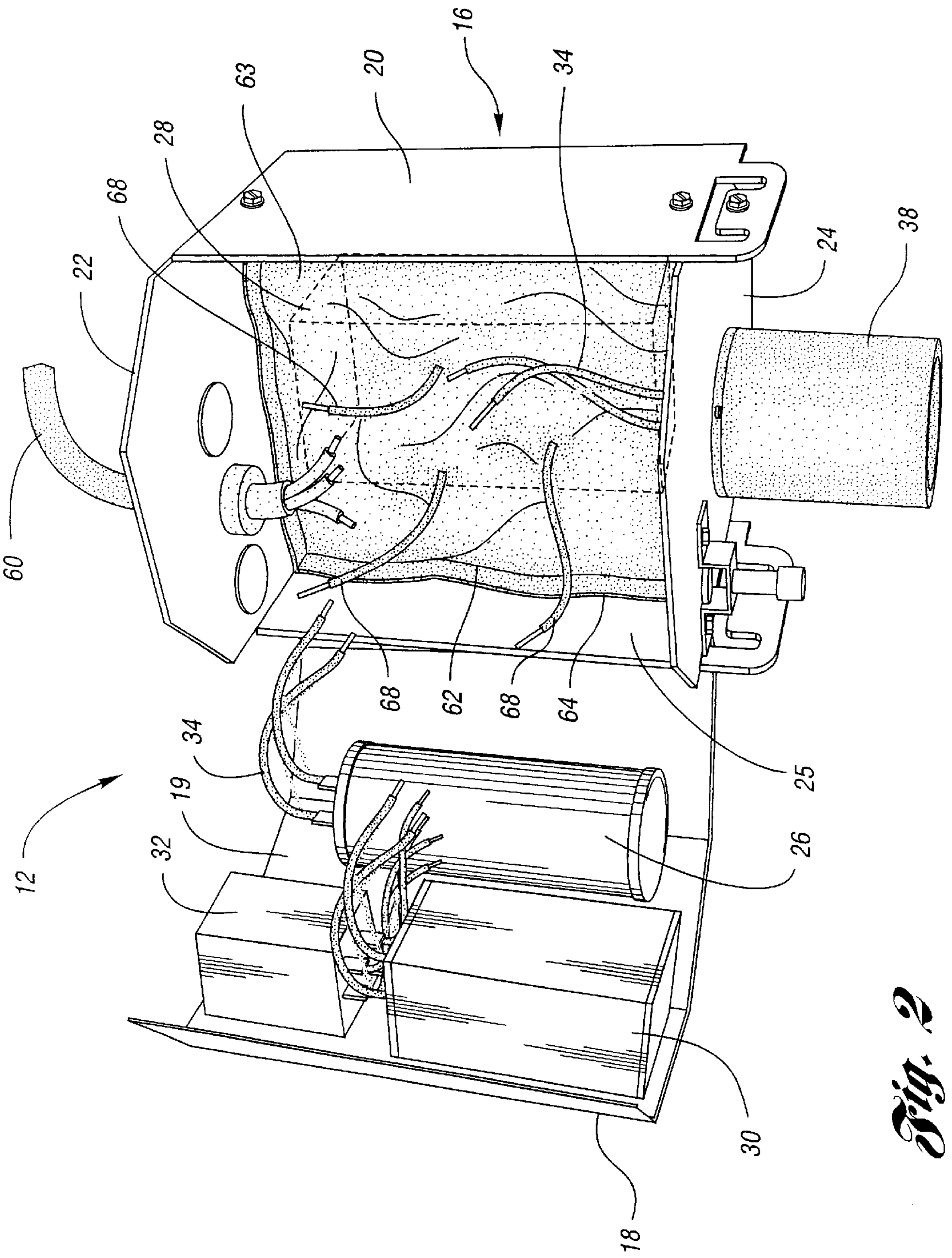
FIG. 2 is a perspective view of the electrical assembly according to the present invention in an assembled state, in which the ballast is shown in broken lines.
Figure 3:
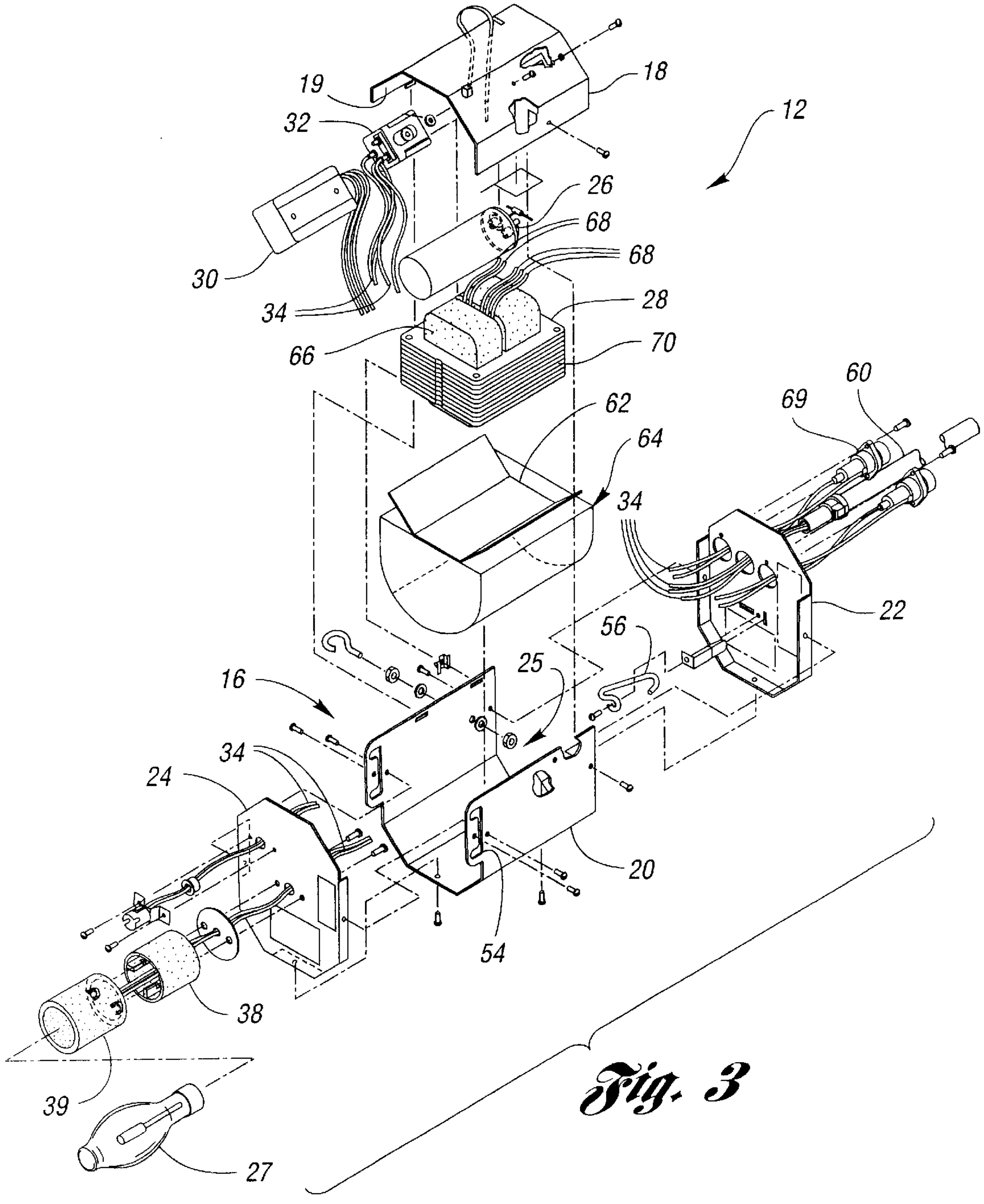
FIG. 3 is a perspective assembly diagram of an electrical assembly of the luminaire assembly according to the present invention.
Figure 4:
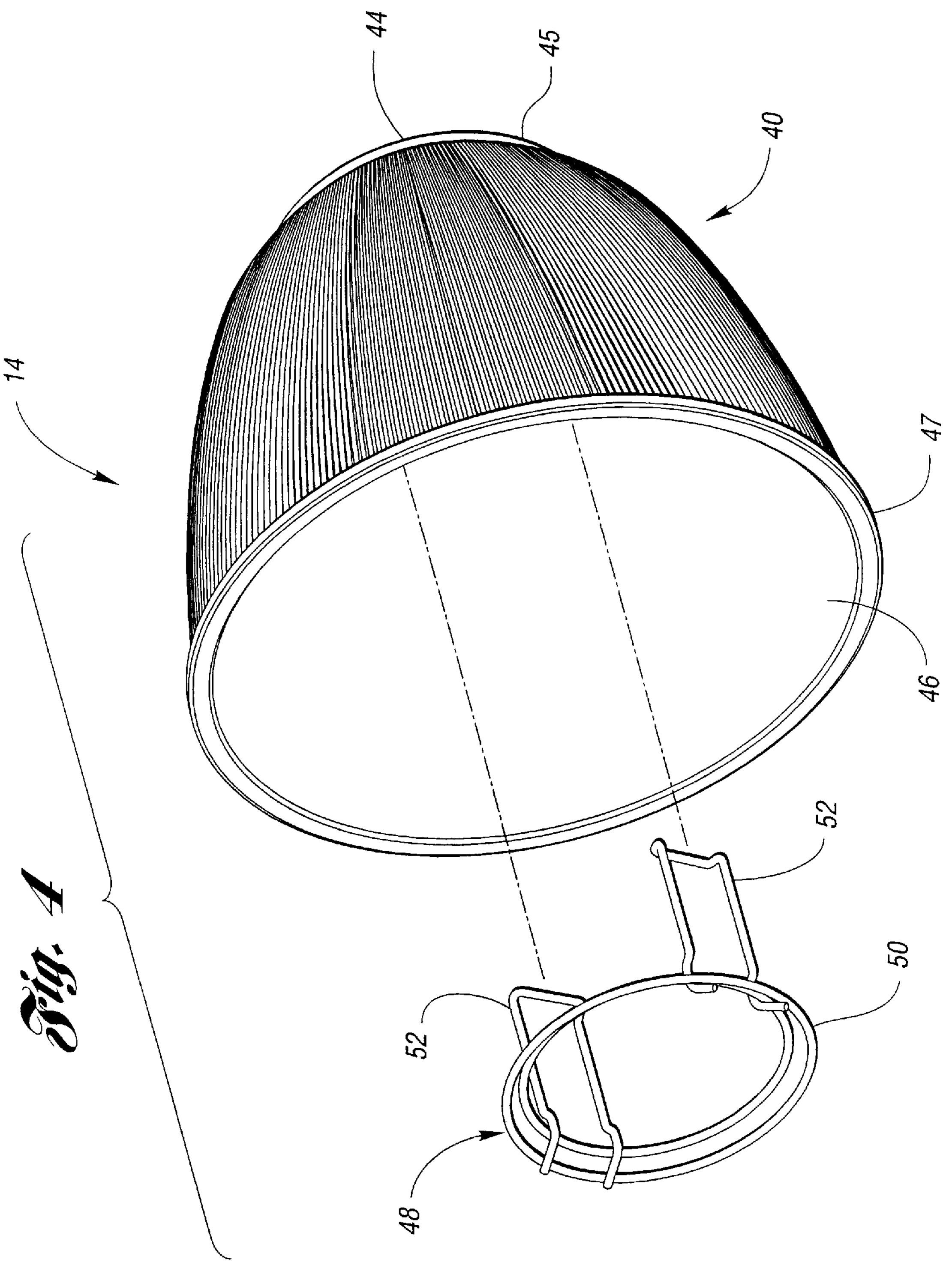
FIG. 4 is a perspective assembly illustration of an optical assembly of the luminaire assembly according to the present invention.

With reference to FIG. 1 of the drawings provided herein, a luminaire assembly 10 according to the present invention is illustrated. Luminaire assembly 10 according to the present invention is particularly suitable to an indoor application for retail and light industrial applications, such as open assembly areas. With further reference to FIGS. 2–4 of the drawings, luminaire assembly 10 includes an electrical assembly 12 (best shown in FIGS. 2 and 3) and an optical assembly 14 (best shown in the optical assembly of FIG. 4).

Referring now to FIGS. 2 and 3, electrical assembly 12 has a housing 16 which is formed of a plurality of panels, including a front panel or cover 18, a rear panel 20 (body portion), a top panel 22 (cord plate), and a bottom panel 24 (socket plate), which are joined together by various fasteners as shown in FIG. 3. The panels 18, 20, 22 and 24 are preferably formed of sheet metal, which is less costly than the aluminum castings often used for luminaire housings but which is functionally sufficient for the indoor environment for which the preferred embodiment of the luminaire assembly is directed, because it does not have to meet the demands of the often harsh outdoor environment. Accordingly, such a housing is suitable to indoor environments, and is particularly suitable to retail and light industrial environments.

As is further illustrated in FIGS. 1–3, housing 16 of electrical assembly has an octagonal shape or cross-section and defines a compartment or cavity 25 therein. Electrical assembly 12 further includes a capacitor 26, a ballast 28, and in another embodiment may also include a starter 30 and a relay 32. Electrical assembly further includes various electrical wiring 34 and connections necessary to operate the luminaire which are stored in housing 16. Electrical wiring 34 leading from socket 39 to ballast 28 and other electrical components such as capacitor 26, are electrically connected according to circuit diagrams and configurations known to those skilled in the art to operate selected luminaires, lighting units and optical assemblies. A socket spacer 38 and socket 39 for retaining a lamp 27 projects from housing 16 of electrical assembly 12 and is attached to wiring 34 necessary to provide power to the socket. Lamp 27 generates light for providing the desired illumination.

As further seen in FIG. 4, luminaire assembly 10 also includes an optical assembly 14 having a optical member 40 for directing light at angles of varying degrees according to the desired lighting pattern. It is contemplated that optical member 40 may be any glass, plastic, or metallic member typical of those used in the art for distributing light, including but not limited to a glass or plastic reflector, refractor, a combination reflector/refractor, or a metallic reflector. Optical member 40 has an upper opening 44 at the top defined by the upper circumference 45 for receiving lamp 27 therethrough. Optical member 40 also has a lower opening 46 defined by the bottom circumference 47 for assisting in providing downlight to the environment in which luminaire assembly 10 is used.

Also provided in optical assembly 14 is a hanger 48 which connects optical member 40 to electrical assembly 12 (and particularly housing 16), and allows, in the embodiment shown, optical member 40 to be suspended from electrical assembly 12. As illustrated in FIG. 4, hanger 48 has an annular ring portion 50 and a pair of suspension members 52. Hanger 48 is assembled with optical member 40 as shown in FIGS. 1 and 4, wherein hanger 48 is inserted through lower opening 46 and is oriented adjacent opening 44. Annular ring portion 50 has a diameter greater than that of upper opening 44, so-that optical member 40 is supported and suspended on annular ring portion 50. Suspension members 52 are preferably attached to housing 16 by being hooked into openings 54 of rear panel 20 as shown in FIGS. 1 and 2, thereby suspending optical member 40 therefrom. While luminaire assembly 10 may be positioned in various orientations and locations indoors, it is preferably attached suspended by a hook 56 suspended from the ceiling, thus requiring no tools for installation.

As stated, housing 16 defines an internal chamber or cavity 25 therein, wherein ballast 28 and capacitor 26 are located, in addition to any other componentry, electrical or otherwise, which may be convenient to locate within internal chamber 25, such as starter 30 and relay 32. Again, housing 16 is preferably made of sheet metal but may be made of any material of suitable strength which serves to dissipate the heat generated by ballast 28 during operation.

According to the teachings of the present invention, ballast 28 and the remainder of electrical assembly 12 are finished and assembled concurrently in order to achieve the time-savings, cost-savings, efficiency in assembly, and just-in-time objects and goals sought by the Applicants herein, and avoiding the multiple steps and lengthy procedure of the prior art discussed herein. Particularly, this is achieved according to the "potting process" disclosed herein for potting an unimpregnated ballast 28 while it is disposed within housing 16. As is known in the art, ballast 28 includes a series of winding coils 66 of magnet wire which are assembled onto a stack of core steel laminations 70 which are welded together. The coils are constructed with long start tap and finish leads 68, but without external leads that are typically present. This ballast, without further processing or coating, is an unimpregnated ballast.

With regard to the electrical assembly 12, the power supply cord 60 and fuseholder(s) 69 are assembled to cord plate 22. The lamp socket and socket spacer 39 and 38 are assembled to socket plate 24. The leads for the power supply cord 60 and socket are attached directly to the long start tap and finish leads 68 of coil 66. The top cord plate 22 and socket plate 24 are secured to housing 16.

As shown in FIG. 2, unimpregnated ballast 28 (shown in phantom broken lines) is then placed in cavity 25 of housing 16 with an insulator 62, preferably in pad or sheet form as shown, placed therebetween. This assembly is vibrated as a mixture 63 of a curable thermoset polymer resin (potting compound) and a filler of finely divided inorganic particulate is introduced into cavity 25. The curable polymer resin may be any such resin suitable for this application, preferably thermoset, including polyester, polyurethane, urethane, or epoxy. The inorganic particulate should have sufficient heat conduction properties for the application. In a preferred embodiment, the finely divided inorganic particulate is sand and the thermoset polymer resin is a polyester resin, and such is introduced into cavity 25 in a 3:1 ratio by weight, encapsulating ballast 28 and impregnating it sufficiently to provide suitable characteristics for its use. Ballast 28 is encapsulated with the exception of the coil leads 68 (of which three are shown in FIG. 2) projecting therefrom which must be free to connect with the various other electrical components.

In a preferred embodiment, due to the liquidous nature of the polymer resin and sand mixture prior to cure, a bag 64 made of plastic or other material is provided within cavity 25 for receiving and retaining ballast 28 and further for receiving the mixture so that the mixture does not leak through any openings in or between housing panels 18, 20, 22 and 24. Thus bag 64 seals cavity 25 of housing 16 so the mixture does not leak out prior to it curing and thickening. Of course, when bag 64 is used within assembly 10, mixture 63 indirectly engages the inner surface of housing 16. It is contemplated that a caulking material, tape, or other suitable sealing material may be used to cover and seal any openings to prevent seepage of the mixture. Of course, the potting mixture and the means used to seal should be chemically compatible. The preferred encapsulating (potting) resins are unsaturated polyester resins. Such resins are available from numerous sources. One such source is Pedigree™ No. 300LV polyester resin available from the P.D. George Company of St. Louis, Mo., which contains approximately 29.5 to 33.5% by weight monomer content in the unfilled form.

Vibration allows for the distribution of sand throughout the resin matrix and also allows the mixture to penetrate the interstices of ballast 28 without the use of a vacuum. As a filler, sand is relatively inexpensive and also increases thermal conductivity of the potting mixture. The mixture is permitted to cure to a thickened state which takes approximately 45 minutes to 1 hour. To complete electrical assembly 12, all of the connections are made to ballast 28—from the ballast coil leads to the other electrical components necessary for operation of luminaire 10, such as capacitor 26, socket 29 and plug (cord) 60—and housing 16 is closed by closing cover panel 18, best shown in FIG. 2.

Thus, according to the teachings disclosed herein, the potting of ballast 28 can be obtained in conjunction with the assembly of electrical assembly 12 in a relatively time efficient assembly. Ballast 28 is therefore disposed within the thickened potting mixture. This thickened mixture cures within housing cavity 25, thus providing for securement of ballast 28 within housing 16. Thus, potting unimpregnated ballast 28 provides a way to secure the ballast inside the unit without the material or labor to install brackets used for that purpose. The potting of ballast 28 is thus an integral part of electrical assembly 12 in order to make it small enough and less costly.

In addition, the thermal performance of electrical assembly 12 is improved. Because ballasts tend generate heat during operation, there is a need to dissipate heat from cavity 25 which is achieved by the sand in the potting mixture which acts as a conductor and transfers the heat to housing 16 and away from cavity 25. The potting material, and particularly the sand therein, conducts the heat to the outside surface where it is dissipated. Because capacitor 26, starter 30 and relay 32 are more temperature sensitive than ballast 28, the heat dissipated by ballast 28 is removed from housing 16. Particularly, the thermal limit on a typical capacitor is approximately 90° C. and on a typical ballast it is 165° C. Thus, a ballast can operate at a higher temperature than a capacitor. Accordingly, potting effectively conducts the heat that is generated by a ballast to the outside surfaces. It also provides for reducing noise by damping the magnetically-induced movement of the laminations.

Potting of ballast 28 without any prior impregnation also provides advantages over a typical ballast which is used in luminaires. Prior to their introduction into a typical electrical assembly, ballasts in the prior art are typically processed as a separate component by a lengthy procedure known as impregnation. In the impregnation process, a ballast is pre-heated and then impregnated with varnish by dipping or otherwise being immersed into a varnish bath. This dipping may be performed under vacuum in order to allow impregnation material to penetrate the interstices of the ballast. The ballast is then post-cured by baking it in an oven in order to cure the varnish. For a typical luminaire ballast, this impregnation process could take upwards of 8 hours, with a great deal of that time devoted to post-cure (approximately 5 hours for many ballasts). Subsequent to this varnishing or impregnation procedure, the typical ballast must still be mounted to and attached to the rest of its electrical assembly.

Accordingly, a typical luminaire is then assembled by placing the completed ballast, the capacitor, and if desired, the fuseholder, starter, and relay, into some type of housing, securing them in position with brackets, straps, screws or other methods and making appropriate electrical connections between these components.

On the other hand, according to the present invention, ballast 28 is not subjected to the impregnation or varnish dipping process, but instead is concurrently encapsulated by the potting process and integrated into the assembly of electrical assembly 12. The unfinished ballast is potted and in approximately 1 hour, the potting material sets up and encapsulates and sufficiently impregnates the ballast in a satisfactory manner for this application. Thus, the luminaire can be assembled and delivered to the customer in a timely manner without the lead time or stock buildup required in the past.

As previously mentioned, and as shown in FIGS. 1–3, housing 16 shown herein has an octagonal sectional plan view. In one embodiment, the octagonal shape provides for a relatively smaller inner housing 16 with a corresponding relatively small inner volume for retaining the electrical componentry such as capacitor 26 and ballast 28, yet which is still able to be cost efficiently and feasibley manufactured. Such a smaller housing may serve to improve the uptight or downlight of assembly 10, depending on the placement of electrical assembly 12 (above or below, respectively, optical assembly 14), by providing less blocking of the path of light in a given direction.

Moreover, the teachings according to the invention allow housing 16 to be this size. With typical luminaire electrical assemblies, the housing is relatively larger to provide relatively more surface area to dissipate the heat produced by an unpotted ballast. On the other hand, in a luminaire according to the present invention, the potting material which encapsulates ballast 28 to permit better conduction of the generated heat. The reduced size of electrical assembly 12 permits its application in areas where mounting space is limited, as is often the case in retail or light industrial environments, where a smaller luminaire may be more appropriate from an appearance standpoint.

However, it is contemplated that housing 16 may have one of a plurality of different shapes. While the shape of housing 16 may vary with imagination, it must be able to support the weight of ballast 28 and other desired components within, as well as the weight of optical assembly 14 attached thereto.

As shown in FIGS. 2 and 3, housing 16 includes removable cover panel 18, which allows for ease of assembly and access to cavity 25, and particularly to capacitor 26, starter 30, and relay 32 for maintenance purposes. In a preferred embodiment, capacitor 26, starter 30, and relay 32 are directly attached to an inner surface 19 of removable cover panel 18 forming a subassembly and their leads 34 are attached directly to the long start tap and finish leads 68 of ballast 28 coils as appropriate.

While the invention has been particularly shown and described in reference to the preferred embodiment thereof, it will be understood by those skilled in the art that various changes in form and details may be made therein without departing from the spirit and scope of the invention.

What is claimed is:

1. A luminaire assembly having an optical assembly for directing light generated by a lamp, the luminaire assembly comprising:

an electrical assembly including a housing having a body portion defining a cavity therein and a removable cover portion, the removable cover portion having at least one electrical component mounted thereto extending into the cavity; and a ballast disposed within the cavity and having coil leads attached thereto, the ballast encapsulated within a curable mixture of polymer resin and finely divided inorganic particulate, wherein in a cured state the mixture forms a protective covering around the ballast and the coil leads project out from said curable mixture and are connected with the at least one electrical component.

2. The luminaire assembly of claim 1 wherein the polymer resin is a polyester resin.

3. The luminaire assembly of claim 1 wherein the finely divided inorganic particulate is sand.

4. The luminaire assembly of claim 1 wherein the finely divided inorganic particulate and the polymer resin are provided in, respectively, a 3:1 ratio by weight.

5. The luminaire assembly of claim 1 further comprising a thin plastic sheet disposed between the ballast and the housing to support the polymer resin and finely divided inorganic particulate prior to curing.

6. The luminaire assembly of claim 5 further including an insulating member disposed between the thin plastic sheet and the housing.

7. A luminaire assembly comprising:

a housing having an interior surface defining a cavity therein;

an unimpregnated ballast having coil leads projecting therefrom and disposed within the cavity and encapsulated within a mixture of polyester resin and sand which cures to a thickened state having the ballast disposed therein, said leads projecting out from the encapsulation and within said housing;

a lamp;

a lamp socket mounted to the housing and electrically connected to the ballast, the lamp socket receiving said lamp therein for operatively generating light; and an optical member disposed about said lamp for directing the light at varying angles.

* * * * *